United States Patent
Kamiyama et al.

(10) Patent No.: US 7,690,410 B2
(45) Date of Patent: Apr. 6, 2010

(54) VEHICLE WHEEL

(75) Inventors: Youichi Kamiyama, Saitama (JP);
Mikio Kashiwai, Saitama (JP);
Hisamitsu Takagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 12/150,753

(22) Filed: Apr. 30, 2008

(65) Prior Publication Data

US 2008/0277997 A1    Nov. 13, 2008

(30) Foreign Application Priority Data

May 10, 2007    (JP) .............................. 2007-125139

(51) Int. Cl.
*B60B 21/02* (2006.01)
*B60C 19/00* (2006.01)

(52) U.S. Cl. .................................... 152/381.5; 301/6.91

(58) Field of Classification Search .............. 152/381.5, 152/381.6, 400, 516, 518, 519, 520; 301/95.104, 301/6.91, 40.3; 295/7
See application file for complete search history.

(56) References Cited

U.S. PATENT DOCUMENTS

| | | | | |
|---|---|---|---|---|
| 4,078,597 A | * | 3/1978 | Noda ....................... | 152/381.6 |
| 4,896,921 A | | 1/1990 | Sato et al. | |
| 4,922,981 A | * | 5/1990 | Pompier ..................... | 152/158 |
| 5,479,976 A | * | 1/1996 | Cho ............................. | 152/518 |
| 6,390,563 B1 | * | 5/2002 | Haverkamp et al. ......... | 301/6.91 |
| 6,516,849 B2 | * | 2/2003 | Flament et al. ............. | 152/400 |
| 6,935,024 B2 | * | 8/2005 | Shimizu ................. | 29/894.353 |
| 7,258,403 B2 | * | 8/2007 | Rolla ....................... | 301/95.11 |
| 2004/0250935 A1 | * | 12/2004 | Morinaga et al. ........ | 152/381.5 |
| 2006/0086446 A1 | * | 4/2006 | Ratet et al. ................. | 152/400 |

FOREIGN PATENT DOCUMENTS

| | | |
|---|---|---|
| EP | 1 428 686 A1 | 6/2004 |
| JP | 2002-234304 | 8/2002 |
| JP | 2003-326905 | 11/2003 |
| JP | 2004-090669 | 3/2004 |
| JP | 2004291896 A * | 10/2004 |
| JP | 2004306653 A * | 11/2004 |
| JP | 2005219739 A * | 8/2005 |
| JP | 2007-145191 | 6/2007 |

* cited by examiner

*Primary Examiner*—S. Joseph Morano
*Assistant Examiner*—Kip T Kotter
(74) *Attorney, Agent, or Firm*—Carrier, Blackman & Associates, P.C.; Joseph P. Carrier; William D. Blackman

(57) ABSTRACT

A vehicle wheel in which an additional air chamber member in a tire air chamber is fixed on an outer circumferential surface of a well portion, includes: a first vertical wall surface rising outward in a radial direction from the outer circumferential surface of the well portion and extending in a circumferential direction of the outer circumferential surface; and a second vertical wall surface formed in the well portion facing the first vertical wall surface. The additional air chamber member has an additional air chamber and a communication hole formed therein. The communication hole provides communication between the additional air chamber and the tire air chamber. The additional air chamber member is fitted between the first and second vertical wall surfaces. Side end portions of the additional air chamber member in a width direction of the vehicle wheel are secured between the first and second vertical wall surfaces.

9 Claims, 9 Drawing Sheets

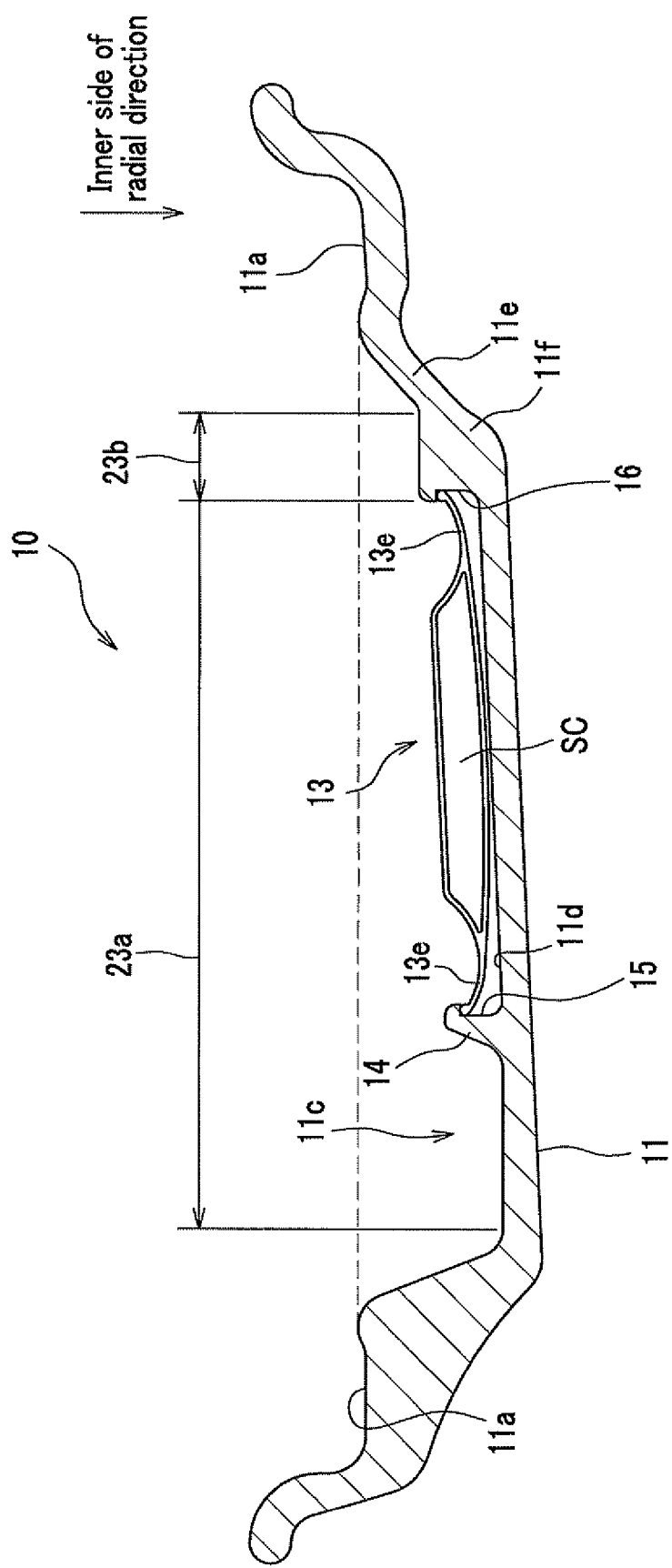

VEHICLE WHEEL

CROSS REFERENCE TO RELATED APPLICATIONS

This application claims the foreign priority benefit under Title 35, United States Code, §119(a)-(d) of Japanese Patent Application No. 2007-125139, filed on May 10, 2007, the contents of which are hereby incorporated by reference.

BACKGROUND OF THE INVENTION

1. Field of the Invention

The present invention relates to a vehicle wheel which reduces a noise emission accompanying an air column resonance (cavernous resonance) inside an air chamber of a tire.

2. Description of Related Art

In general, it is known that an air column resonance generated in an air chamber of a tire (hereinafter, referred to as tire air chamber) causes a road noise of a vehicle. The air column resonance is a phenomenon which generates a resonant sound in such a manner that an air in the tire air chamber is vibrated due to random vibrations transmitted from a road surface to the tire, and as a result, a resonant phenomenon occurs at around an air column resonance frequency of the tire air chamber.

Hitherto, a vehicle wheel described in Japanese Patent Laid-open Publication No. 2004-90669 has been known as the vehicle wheel which reduces the noises accompanying the air column resonance. The vehicle wheel includes a plurality of additional air chambers along a circumferential direction of a rim. For more details, in the vehicle wheel, a circular space portion formed between a circular vertical wall which is vertically disposed at a well portion extending in the circumferential direction of the rim and a rising side wall of the well portion toward a bead seat portion side is covered with a cap member. Then, the circular space portion zoned by the cap member, the well portion, and the vertical wall is partitioned by a plurality of separators which are disposed at predetermined intervals in the circumferential direction to form each of the additional air chambers. In addition, the tire air chamber and each of the additional air chambers are communicated with each other through a communication hole formed in the cap member. According to the vehicle wheel described above, the communication hole and additional air chamber constitute a Helmholtz resonator and the air column resonance sound in the tire air chamber can be reduced.

However, the vehicle wheel described above has not a practical structure. That is, it has been necessary to accurately joint a plurality of separators and cap member by welding, bonding, fitting, and fastening, while keeping airtightness to the vehicle wheel where the vertical wall rising from the well portion is formed. Therefore, a mass production of the vehicle wheel has been unsuitable considering securing of the airtightness, a manufacturing manpower, and an increase in the manufacturing cost.

It is, therefore, an object of the present invention to provide a vehicle wheel which can improve mass productivity of the vehicle wheel.

SUMMARY OF THE INVENTION

According to a first aspect of the present invention to solve the above issue, there is provided a vehicle wheel in which an additional air chamber member in a tire air chamber is fixed on an outer circumferential surface of a well portion, which includes: a first vertical wall surface rising outward in a radial direction from the outer circumferential surface of the well portion and extending in a circumferential direction of the outer circumferential surface; and a second vertical wall surface formed in the well portion facing the first vertical wall surface, wherein the additional air chamber member includes an additional air chamber formed therein and a communication hole communicating between the additional air chamber and the tire air chamber; and wherein the additional air chamber member is fitted between the first vertical wall surface and the second vertical wall surface, and both end portions of the additional air chamber member in a width direction of the vehicle wheel are secured between the first vertical wall surface and the second vertical wall surface.

The vehicle wheel according to the present invention is different from a vehicle wheel described in Japanese Patent Laid-open Publication No. 2004-90669 in that the vehicle wheel according to the present invention can be manufactured by only fitting in the additional air chamber member, which has the additional air chamber in advance, between the first vertical wall surface and the second vertical wall surface formed on the well portion, on the contrary, in the vehicle wheel described in the Japanese Patent Laid-open Publication No. 2004-90669, a plurality of separators, cap member, and etc. are sequentially assembled with the wheel, then, the additional air chambers are formed by accurately jointing these considering airtightness.

In the vehicle wheel described above, it is preferable that the first vertical wall surface is disposed on a vertical wall substantially vertically disposed on the outer circumferential surface extending in the circumferential direction, and the second vertical wall surface is disposed in a rising portion of the well portion, wherein a groove extending in the circumferential direction is formed on each of the first vertical wall surface and the second vertical wall surface, and each of the end portions of the additional air chamber member is fitted in the groove.

In the vehicle wheel, since the both end portions of the additional air chamber member are fitted in the grooves formed on the first vertical wall surface and the second vertical wall surface, respectively, the additional air chamber member is further completely fixed on the well portion side.

In addition, in the vehicle wheel described above, the additional air chamber member may be constituted such that the additional air chamber member has a curved portion that is in a convex shape against the outer circumferential surface between the both end portions, and when a centrifugal force generated by a rotation of the vehicle wheel works on the additional air chamber member, a pressing force of the both end portions against the first vertical wall surface and the second vertical wall surface is increased by the centrifugal force which works to turn over a curvature of the curved portion in a direction in which the curved portion goes apart from the outer circumferential surface.

In the vehicle wheel, since the pressing force of the both end portions against the first vertical wall surface and the second vertical wall surface is increased under the centrifugal force, the additional air chamber member is further completely fixed on the well portion side.

In addition, in the vehicle wheel described above, it is preferable that a maximum diameter in the additional air chamber member is set smaller than a maximum diameter in a bead seat portion, and a cross sectional shape of the additional air chamber member is formed flat.

In the vehicle wheel, since contacts of tools such as a lever and the tire with the additional air chamber member are reduced, a tire mounting performance is improved.

In addition, in the vehicle wheel, since the additional air chamber member is formed flat, a predetermined volume of the additional air chamber is secured even if the maximum diameter in the additional air chamber member is decreased.

In addition, in the vehicle wheel described above, it is preferable that the well portion includes a small diameter portion and a large diameter portion continuing from the small diameter portion via a step portion, wherein the first vertical wall surface is disposed on the vertical wall extending in a circumferential direction of the small diameter portion, and the second vertical wall surface is disposed on the step portion.

In the vehicle wheel, since the well portion fixing the additional air chamber member can be shifted to further inner side in the radial direction, a circumferential length of the well portion can be shortened. Therefore, weight saving of the vehicle wheel is further improved.

In addition, in the vehicle wheel described above, the additional air chamber member may be constituted such that additional air chamber member includes a protruding portion protruding in a direction crossing with a rotation direction of the vehicle wheel, and wherein a recess, into which the protruding portion fits, is formed on the vertical wall substantially vertically disposed on the outer circumferential surface.

In the vehicle wheel, since the protruding portion is fitted in the recess of the vertical wall, a rotation of the additional air chamber member is completely stopped when the wheel rotates.

In addition, in the vehicle wheel described above, the protruding portion may be formed by a tube member, and the communication hole may be formed inside the tube member.

In the vehicle wheel, since a member other than the protruding portion is unnecessary for forming the communication hole, the structure of the vehicle wheel can be simplified and the weight of the vehicle wheel can be further reduced.

In addition, in the vehicle wheel described above, it is preferable that the additional air chamber member includes a main body including the additional air chamber and a plate-like edge portion extending from the main body to a periphery thereof, wherein the edge portion extends to the first vertical wall surface and to the second vertical wall surface to be fitted in each of the grooves formed on the first vertical wall surface and the second vertical wall surface, respectively, and extends in the circumferential direction along the outer circumferential surface.

In the vehicle wheel, when the centrifugal force generated by the rotation of the vehicle wheel works on the additional air chamber member, the edge portion extending to the circumferential direction from the main body is secured by the first vertical wall surface and the second vertical wall surface. Therefore, a periphery end portion of the additional air chamber member is prevented from lifting up from the outer circumferential surface of the well portion.

According to a vehicle wheel of the present invention, the vehicle wheel can be manufactured by only fitting in an additional air chamber member, which has an additional air chamber in advance, between the first vertical wall surface and the second vertical wall surface. Accordingly, mass productivity of the vehicle wheel can be improved, as well as the manufacturing manpower and cost can be reduced in comparison with the conventional vehicle wheel.

BRIEF DESCRIPTION OF THE DRAWINGS

FIG. 7 is a cross sectional view of a rim used for a vehicle wheel according to another embodiment of the present invention;

DETAILED DESCRIPTION OF THE PREFERRED EMBODIMENT

Figure 1:
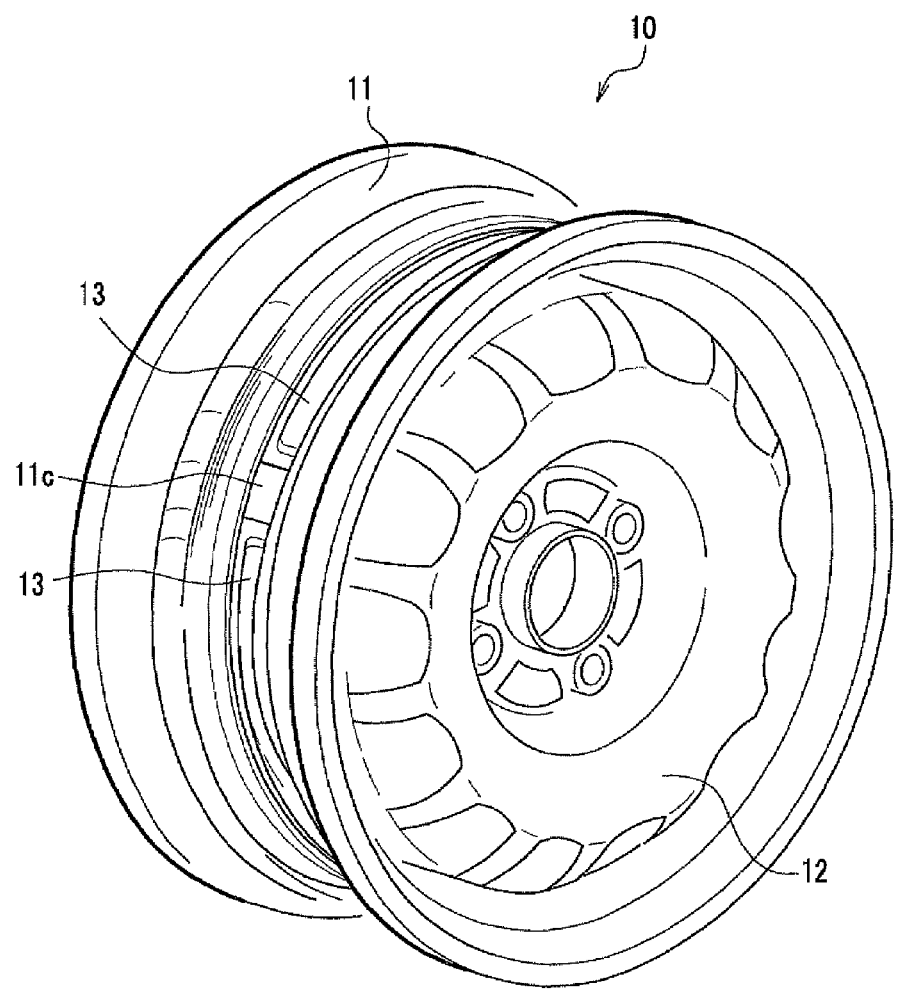
FIG. 1 is a perspective view of a vehicle wheel according to an embodiment of the present invention.
Figure 2:
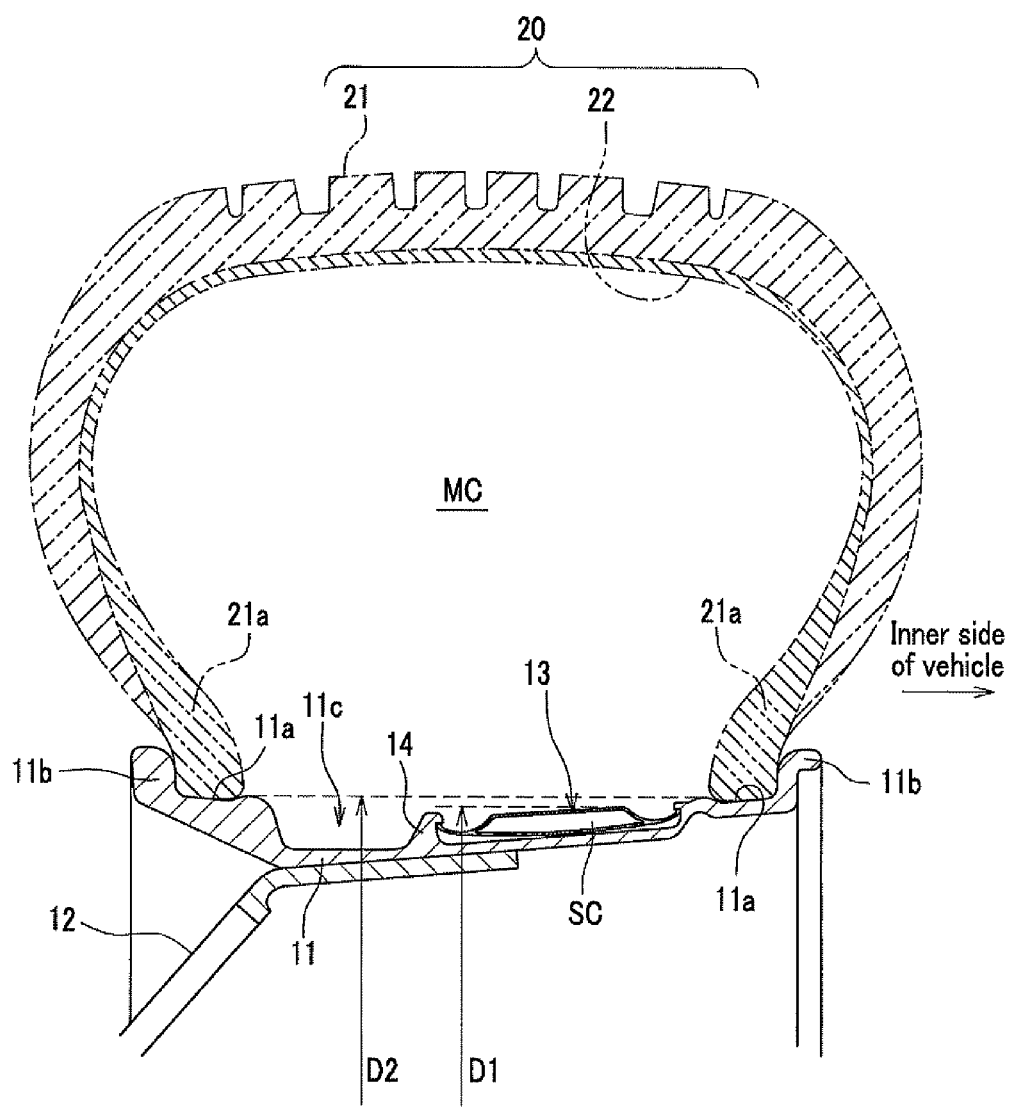
FIG. 2 is a main part front cross sectional view of a wheel mounting a tire on a vehicle wheel shown in FIG. 1.
Figure 3:
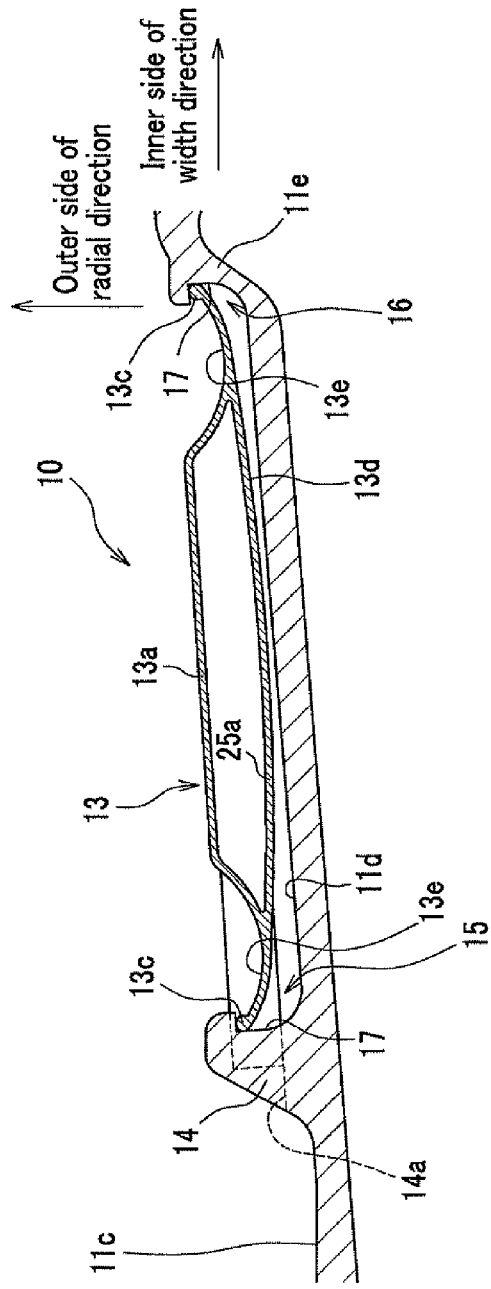
FIG. 3A is a main part front cross sectional view, in which a well portion on which an additional air chamber member is fixed is partially enlarged.
FIG. 3B is a perspective view of a recess formed in a vertical wall of the well portion.

Hereinafter, a vehicle wheel according to the embodiment of the present invention will be explained in details by referring to drawings as appropriate. FIG. 1 is a perspective view of a vehicle wheel according to an embodiment of the present invention. FIG. 2 is a main part front cross sectional view of a wheel mounting a tire on a vehicle wheel shown in FIG. 1. FIG. 3A is a main part front cross sectional view in which a well portion on which an additional air chamber member is fixed is partially enlarged. FIG. 3B is a perspective view of a recess formed in a vertical wall of the well portion.

A vehicle wheel according to the present invention is characterized in that an additional air chamber member (Helmholtz resonator) is fitted in and fixed on a well portion side. Here, a whole constitution of the vehicle wheel will be explained first, and then, a constitution of the additional air chamber member will be explained.

As shown in FIG. 1, a vehicle wheel 10 according to the embodiment is composed of a rim 11 for mounting a tire 20 (see FIG. 2), a disk 12 for connecting the rim 11 to a hub not shown, and an additional air chamber member 13 which is fixed on an outer circumferential surface 11d (see FIG. 3A) of a well portion 11c composing the rim 11.

As shown in FIG. 2, the rim 11 includes bead seat portions 11a, 11a formed on both end portions of the rim 11 in the width direction of the rim 11, rim flange portions 11b, 11b curved in a L shape toward outside from the bead seat portions 11a, 11a, and a well portion 11c concaved inside in a radial direction between the bead seat portions 11a, 11a.

In the bead seat portion 11a, a bead portion 21a of the tire 20 is mounted. This forms a tire air chamber MC which is a circular enclosed space between the rim 11 and an inner circumferential surface of the tire 20. Regarding the tire 20, it is noted that a symbol 21 indicates a tire body and a symbol 22 indicates an inner liner.

The well portion 11c is disposed for fitting the bead portions 21a, 21a of the tire 20 therein when the tire 20 is mounted on the rim 11.

A vertical wall 14 is vertically disposed on an outer circumferential surface of the well portion 11c.

As shown in FIG. 3A, the vertical wall 14 is vertically disposed on the outer circumferential surface 11d so that the vertical wall 14 forms a first vertical wall surface 15 rising outward in the radial direction from the outer circumferential surface 11d of the well portion 11c. In addition, the vertical wall 14 has a circular shape extending in a circumferential direction of the outer circumferential surface 11d. Further, in a side portion 11e formed on the inner side in the width direction of the well portion 11c, a second vertical wall surface 16 is formed facing the first vertical wall surface 15. The side portion 11e corresponds to a "rising portion", together with a step portion 11f (see FIG. 7) of the vehicle wheel 10 according to another embodiment described later. It is noted that the vertical wall 14 according to the embodiment is integrally formed with the well portion 11c when the rim 11 is cast.

A groove 17 is formed on the first vertical wall surface 15 and second vertical surface 16, respectively. These grooves 17, 17 form circular grooves along the circumferential direction of the outer circumferential surface 11d of the well portion 11c. In the grooves 17, 17, an edge portion 13e of the additional air chamber member 13 described later is fitted. It is noted that the grooves 17, 17 according to the embodiment are formed by machining the vertical wall 14 and side portion 11e, respectively.

In addition, as shown in FIG. 3A and FIG. 3B, a recess 14a is formed in the vertical wall 14. A protruding portion 18 (tube member P) of the additional air chamber member 13 described later is fitted in the recess 14a. It is noted that the recess 14a according to the embodiment is simultaneously formed together with the vertical wall 14 when the rim 11 is cast, or formed by machining the vertical wall 14.

As shown in FIG. 2, the disk 12 is continuously formed from an end portion of the rim 11 on the outer side of a vehicle to the inner side in the radial direction. The rim 11 and disk 12 are manufactured using, for example, a light high mechanical strength material such as aluminum alloy and magnesium alloy. However, the material of the rim 11 and disk 12 is not limited, and may be made of, for example, steel. In addition, the vehicle wheel 10 may be a spoke wheel.

Figure 4:
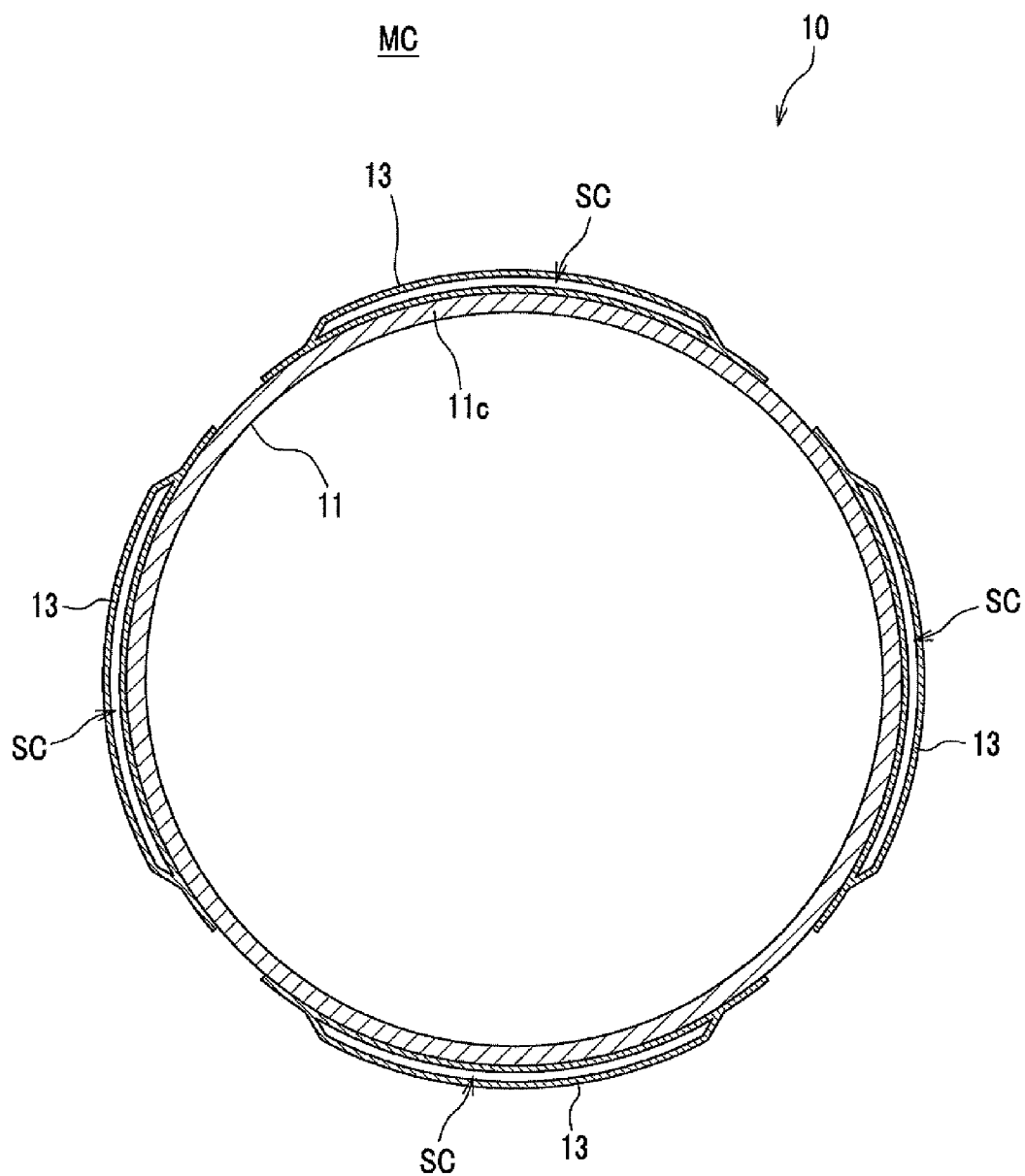
FIG. 4 is a side cross sectional view of a vehicle wheel showing an arrangement position of an additional air chamber member.
Figure 5A:
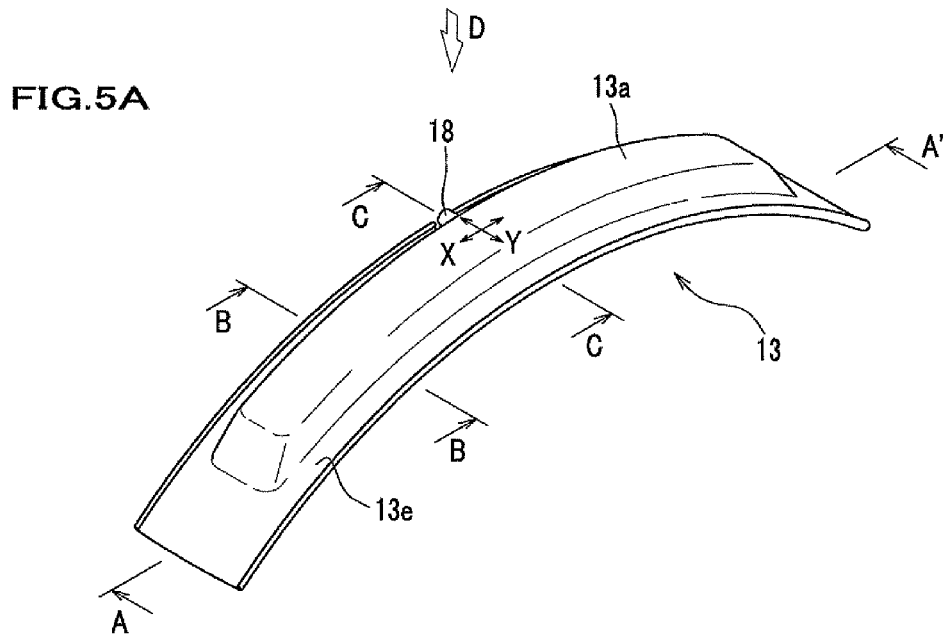
FIG. 5A is a perspective view of an additional air chamber member.
Figure 5B:
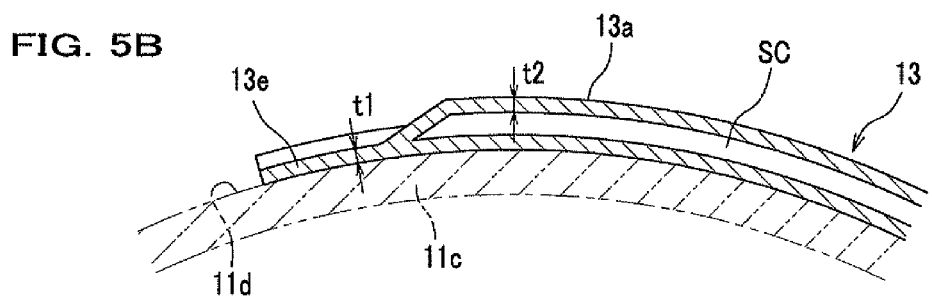
FIG. 5B is a cross sectional view taken along A-A' line of FIG. 5A, which is a partial cross sectional view on A side in FIG. 5A.
Figure 5C:
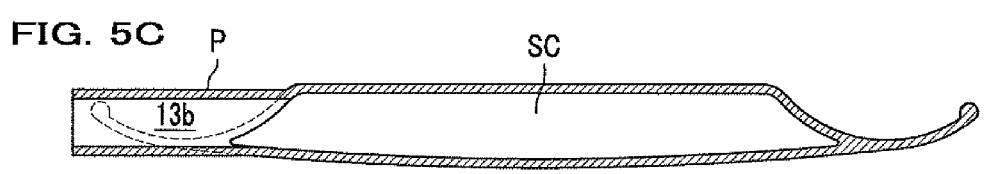
FIG. 5C is a cross sectional view taken along C-C line of FIG. 5A.
Figure 5D:
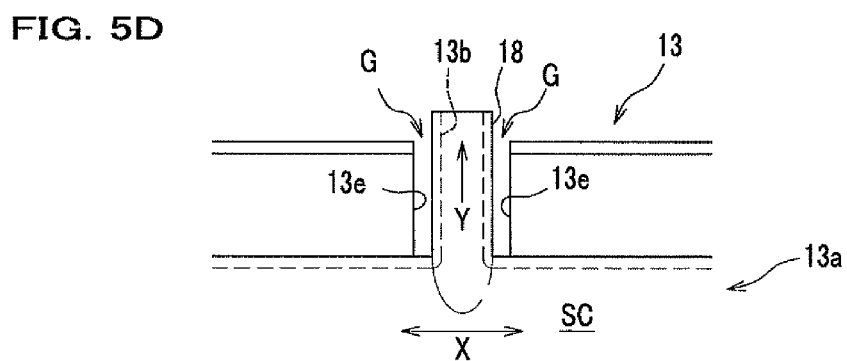
FIG. 5D is a partial plane view of a protruding portion of the additional air chamber member as seen from a D direction in FIG. 5A.

Next, the additional air chamber member 13 will be explained. FIG. 4 is a side cross sectional view of a vehicle wheel showing an arrangement position of an additional air chamber member. FIG. 5A is a perspective view of an additional air chamber member. FIG. 5B is a cross sectional view taken along A-A' line of FIG. 5A, which is a partial cross sectional view on A side in FIG. 5A. FIG. 5C is a cross sectional view taken along C-C line of FIG. 5A. FIG. 5D is a partial plane view of a protruding portion of the additional air chamber member as seen from a D direction in FIG. 5A.

As shown in FIG. 4, the additional air chamber member 13 is a long member in one direction to be arranged along the circumferential direction of the well portion 11c, and includes the additional air chamber SC therein. In the embodiment, four additional air chamber members 13 are arranged along the circumferential surface of the well portion 11c at regular intervals. That is, the vehicle wheel 10 according to the embodiment is provided with two sets of a pair of additional air chamber members 13 facing each other across the center of the rim 11 (hereinafter, referred to as "rim center", simply).

As shown in FIG. 5A and FIG. 5B, the additional air chamber member 13 is curved in the longitudinal direction along the outer circumferential surface 11d (see FIG. 5B) of the well portion 11c.

The additional air chamber member 13 includes a main body 13a where the additional air chamber SC is formed therein and an edge portion 13e extending to its periphery from the main body 13a. A plate thickness t1 of the edge portion 13e is identical to a plate thickness t2 of the main body 13a. It is noted that the edge portion 13e according to the embodiment has spring elasticity through appropriate determination of the thickness t1 and the material described later.

Referring to FIG. 3A which includes a cross sectional view of the additional air chamber member 13 corresponding to a B-B cross section of FIG. 5A, it can be seen that the additional air chamber member 13 is fitted in between the first vertical wall surface 15 and the second vertical wall surface 16 and fixed on the outer circumferential surface 11d of the well portion 11c. For more details, the edge portion 13e extends to both sides of the first vertical wall surface 15 and the second vertical wall surface 16 to be fitted in each groove 17, as well as extends to the circumferential direction along the outer circumferential surface 11d of the well portion 11c from the main body 13a, as shown in FIG. 5B. It is noted that as shown in FIG. 3A, the additional air chamber member 13 is secured by the first vertical wall surface 15 and the second vertical wall surface 16 since both end edges 13c, 13c of the edge portion 13e extending to each side of the first vertical wall surface 15 and the second vertical wall surface 16 from the main body 13a are fitted in each groove 17. The both end edges 13c, 13c correspond to "both end portions".

As shown in FIG. 3A, the additional air chamber member 13 is curved convex toward the outer circumferential surface 11d of the well portion 11c between the both end edges 13c, 13c. That is, a bottom plate 25a composing the main body 13a on the side of the outer circumferential surface 11d constitutes a "curved portion" together with the edge portion 13e extending from the bottom plate 25a. It is noted that the additional air chamber member 13 is, as described later, formed such that a pressing force of the both end edges 13c, 13c against the first vertical wall surface 15 and the second vertical wall surface 16 is increased under a centrifugal force generated by a rotation of the vehicle wheel since the centrifugal force works to turn over a curvature of the curved portion 13d in the reverse direction.

In addition, as shown in FIG. 5A and FIG. 5D, the additional air chamber member 13 includes a protruding portion 18 protruding from the main body 13a in a Y-direction crossing with (orthogonal direction in the embodiment) an X-direction which is a rotation direction of the wheel. It is noted that a gap G is formed between the protruding portion 18 and the edge portion 13e, as shown in FIG. 5D.

As shown in FIG. 3B, the protruding portion 18 extends toward the vertical wall 14 to be fitted in the recess 14a formed in the vertical wall 14. It is noted that the gaps G, G are prepared so that the edge portion 13e can be easily fitted in the groove 17 of the first vertical wall surface 15 (see FIG. 3A)

through bending of the edge portion 13e when the protruding portion 18 is fitted in the recess 14a.

The protruding portion 18 according to the embodiment is, as shown in FIG. 5C, made of the tube member P, and a communication hole 13b connecting the additional air chamber SC and the tire air chamber MC (see FIG. 2) is formed inside the tube member P.

A shape of the additional air chamber SC formed in the additional air chamber member 13 described above is not limited specifically. However, a flat shape in cross sectional view is preferable. As shown in FIG. 3A, the additional air chamber SC according to the embodiment has substantially a rectangular shape which is thin in the radial direction of the well portion 11c. It is noted that as shown in FIG. 2, in the additional air chamber member 13 according to the embodiment, a maximum diameter D1 in the additional air chamber member 13 is set smaller than a diameter D2 in a bead seat portion 11a.

A volume of 50 to 250 cc is preferable for the additional air chamber SC. By setting the volume of the additional air chamber SC within the above range, the additional air chamber member 13 can suppress an increase of the weight to achieve weight saving of the vehicle wheel 10, while sufficiently providing a sound deadening effect. In addition, considering weight adjustment of the vehicle wheel 10 and assembling easiness of the additional air chamber member 13 with the well portion 11c, a length of the additional air chamber member 13 in the circumferential direction can be set as appropriate. A circumferential length of the rim 11 is the maximum length of the additional air chamber member 13.

A cross sectional shape of the communication hole 13b is not limited specifically. In the embodiment, the shape has a circular shape. However, the shape may be, for example, an ellipsoidal shape, polygonal shape, and tunnel shape. Regarding a diameter of the communication hole 13b, it is preferable that the diameter is not less than 5 mm if the cross section has a circular shape. If the cross sectional shape of the communication hole 13b is not a circular shape, it is preferable that the cross sectional area of the communication hole 13b is not less than that of a circular shape having a diameter of 5 mm.

A length of the communication hole 13b is set to meet a formula for calculating a resonant frequency of the Helmholtz resonator shown in the next formula 1.

$$f0 = C/2\pi \times \sqrt{(S/V(L+\alpha\times\sqrt{S}))} \quad \text{(formula 1)}$$

f0 (Hz): Resonant frequency
C (m/s): Sonic speed in additional air chamber SC (equal to sonic speed in tire air chamber MC)
V (m$^3$): Volume of additional air chamber SC
L (m): Length of communication hole 13b
S (m$^2$): Cross sectional area of opening of communication hole 13b
α: Correction coefficient It is noted that the resonant frequency f0 is set to meet a resonant frequency of the tire air chamber MC. In this case, the resonant frequency f0 of each of the four additional air chamber members 13 shown in FIG. 4 may be set identical, or may be set different each other. Specifically, when two resonant frequencies (f1, f2) are observed in the tire air chamber MC, the resonant frequency f0 of the four additional air chamber members 13 may be set at (f1+f2)/2. In addition, it may be possible to set the resonant frequency f0 of one pair of additional air chamber members 13 facing each other across the center of the rim at f1, and that of the other pair of additional air chamber members 13 at f2.

As a material of the additional air chamber member 13, for example, metal, synthetic resin, and rubber, which are common materials used for industrial products, may be used. In addition, considering improvements of weight saving and mass productivity of the additional air chamber member 13, reduction of the manufacturing cost, and securing airtightness of the additional air chamber SC, it is preferable that the material is light, high rigidity, and capable of blow molding. Especially, polypropylene is preferable, which is highly resistant to repeated bending fatigue.

Next, operations and effects of the vehicle wheel 10 according to the embodiment will be explained.

The vehicle wheel 10 according to the embodiment is different from a vehicle wheel described in Japanese Patent Laid-open Publication No. 2004-90669 in that the vehicle wheel 10 according to the embodiment can be manufactured by only fitting the additional air chamber member 13, which has the additional air chamber SC in advance, in the rim 11 (well portion 11c), on the contrary, in the vehicle wheel described above, a plurality of separators and cap member are sequentially assembled with the rim, then, additional air chambers are formed by accurately jointing these, considering airtightness. Therefore, the manufacturing manpower and manufacturing cost of the vehicle wheel 10 according to the embodiment can be reduced in comparison with those of the vehicle wheel described in the Japanese Patent Laid-open Publication No. 2004-90669, and as a result, the mass productivity can be improved. In addition, since a specific consideration for securing airtightness of the additional air chamber SC is unnecessary for the vehicle wheel 10 different from the vehicle wheel described above, a quality of sound deadening performance can be stabilized.

In addition, in the vehicle wheel 10 according to the embodiment, since the resonant frequency can be identified and modified using the additional air chamber member 13 alone before the additional air chamber member 13 is fitted in the rim 11, defective products can be reduced.

In addition, in the vehicle wheel 10 according to the embodiment, when the additional air chamber member 13 is fixed on the rim 11 (well portion 11c), the additional air chamber member 13 is fixed by fitting the end edge 13c in FIG. 3A in the groove 17 formed on each of the first vertical wall surface 15 and second vertical wall surface 16. In this case, since the edge portion 13e has the spring elasticity, the additional air chamber member 13 is easily and strongly fixed between the first vertical wall surface 15 and second vertical wall surface 16.

In addition, in the vehicle wheel 10, as shown in FIG. 3B, since the protruding portion 18 of the additional air chamber member 13 protruding in the Y-direction crossing with the X-direction, which is the rotation direction of the wheel, is fitted in the recess 14a of the vertical wall 14, rotation of the additional air chamber member 13 when the wheel rotates is completely stopped.

Further, since the communication hole 13b is formed inside the protruding portion 18, it is unnecessary to dispose a member other than the protruding portion 18 for forming the communication hole 13b. Accordingly, a structure of the vehicle wheel 10 can be simplified, and thereby can achieve further weight saving.

Figure 6A:
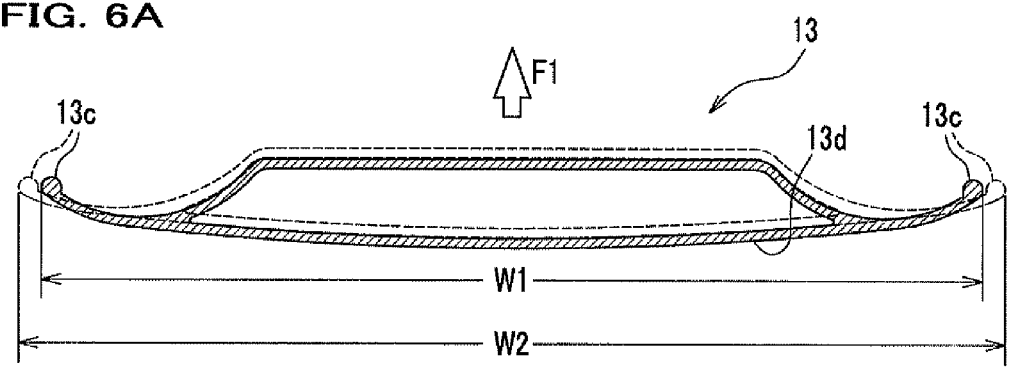
FIG. 6A is a schematic view showing behaviors of an additional air chamber member according to the embodiment under a centrifugal force, which is a cross sectional view taken along B-B line of FIG. 5A.
Figure 6B:
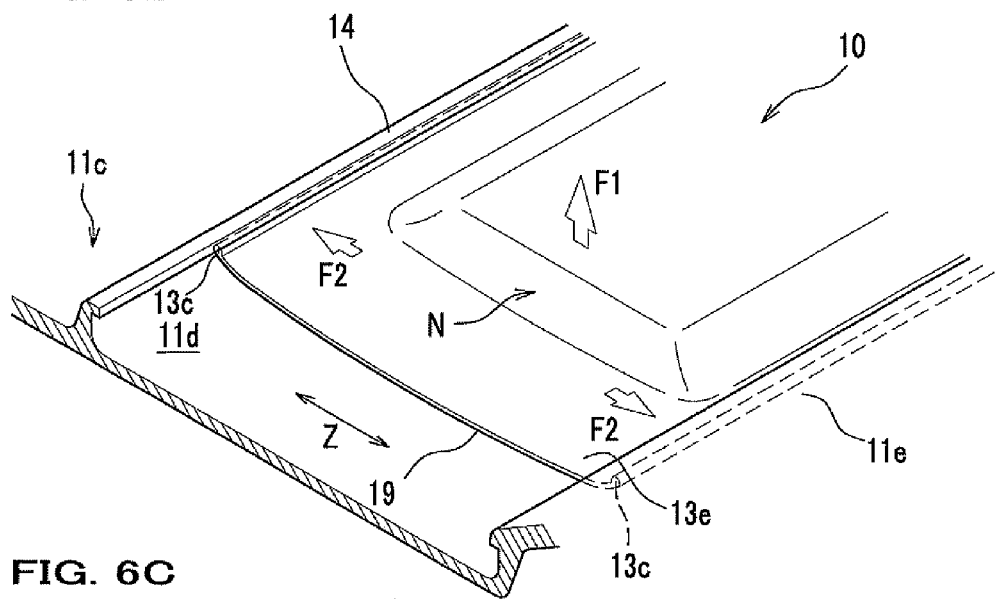
FIG. 6B is a partial perspective view showing behaviors of the additional air chamber member according to the embodiment under a centrifugal force.
Figure 6C:
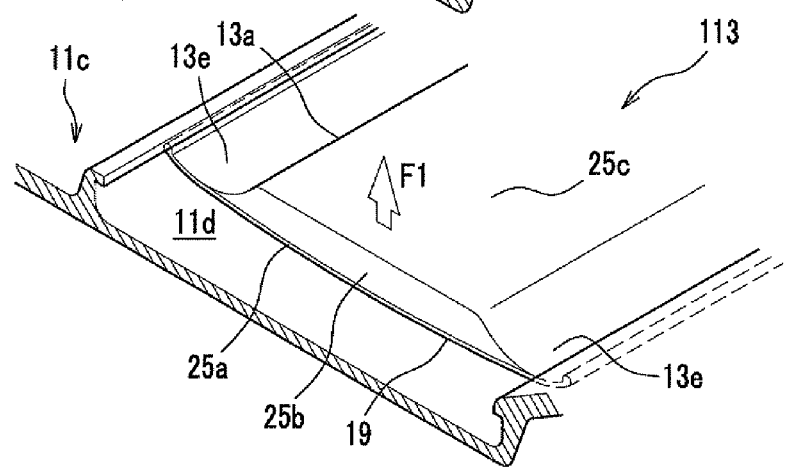
FIG. 6C is a partial perspective view showing behaviors of an additional air chamber member of a comparative example under a centrifugal force.

In addition, in the vehicle wheel 10, the curved portion 13d tends to turn over a curvature of the curved portion 13d in the reverse direction when a centrifugal force generated by a rotation of the vehicle wheel 10 works on the additional air chamber member 13. FIG. 6A is a schematic view showing behaviors of an additional air chamber member according to the embodiment under a centrifugal force, which is a cross sectional view taken along B-B line of FIG. 5A. FIG. 6B is a partial perspective view showing behaviors of the additional air chamber member according to the embodiment under a centrifugal force. FIG. 6C is a partial perspective view showing behaviors of an additional air chamber member of a comparative example under a centrifugal force.

As shown in FIG. 6A, if a centrifugal force F1 works on the curved portion 13d which is convex in the opposite direction of the centrifugal force F1 (centrifugal direction), in other words, if the centrifugal force F1 works on the additional air chamber member 13 having the curved portion 13d which is convex toward the well portion 11c shown in FIG. 3A, the additional air chamber member 13 which is restricted displacement of the both end edges 13c, 13c in the centrifugal direction is stretched in the curved portion 13d since the curved portion 13d tends to turn over the curvature of the curved portion 13d in the reverse direction. As a result, a span W2 between both end edges 13c, 13c of the additional air chamber member 13 under the centrifugal force F1, which is shown in the dotted line, becomes longer than a span W1 between the both end edges 13c, 13c of the additional air chamber member 13 before the centrifugal force F1 works.

Then, as shown in FIG. 6B, the both end edges 13c, 13c (see FIG. 6A) which are restricted displacement to the outer side in the width direction Z of the well portion 11c by the vertical wall 14 and side portion 11e increase a pressing force F2 against the vertical wall 14 and side portion 11e by the centrifugal force F1. That is, in the vehicle wheel 10, since the pressing force of the both end edges 13c, 13c against the first vertical wall surface 15 and second vertical wall 16 shown in FIG. 3A is increased, the additional air chamber member 13 is further completely fixed to the side of the well portion 11c.

In addition, in the vehicle wheel 10, as shown in FIG. 6B, a periphery end portion 19 of the additional air chamber member 13 is prevented from lifting up from the outer circumferential surface 11d when the centrifugal force F1 works on the additional air chamber member 13. Here, the phenomenon described above will be explained using a comparative example. As shown in FIG. 6C, in an additional air chamber member 113 in which the edge portion 13e does not extend in the circumferential direction, a place where masses of, for example, the bottom plate 25a of the main body 13a, an end plate 25b, and an upper plate 25c are concentrated (hereinafter, referred to as mass concentrated place) is located around the periphery end portion 19. As a result, when the centrifugal force F1 works on the additional air chamber member 113, the periphery end portion 19 lifts up from the outer circumferential surface 11d of the well portion 11c, and stress of the edge portion 13e around the periphery end portion 19 is increased.

On the other hand, as shown in FIG. 6B, in the vehicle wheel 10, the edge portion 13e extends from the main body 13a in the circumferential direction along the outer circumferential surface 11d of the well portion 11c. The extended edge portion 13e is fixed by the vertical wall 14 and side portion 11e. As a result, since the mass concentrated place N of the main body 13a is located apart from the periphery end portion 19 and the extended edge portion 13e is fixed on the vertical wall 14 and side portion 11e, the periphery end portion 19 is prevented from lifting up by the centrifugal force F1 from the outer circumferential surface 11d of the well portion 11c. That is, since stress of the edge portion 13e around the periphery end portion 19 is reduced, a fatigue of the edge portion 13e is reduced.

In addition, as described above, since the plate thickness t1 of the extended edge portion 13e according to the embodiment is identical to the plate thickness t2 of the main body 13a (see FIG. 5B), the periphery end portion 19 is further completely prevented from lifting up.

In addition, as shown in FIG. 2, in the vehicle wheel 10, since the maximum diameter D1 in the additional air chamber member 13 is set smaller than the diameter D2 in the bead seat portion 11a, a possibility of contact of tools such as a lever and the tire 20 (for example, bead portion 21a) with the additional air chamber member 13 is reduced when the tire 20 is mounted on the rim. As a result, a tire mounting performance can be improved.

In addition, in the vehicle wheel 10, since the cross sectional shape of the additional air chamber SC is flat, a predetermined volume of the additional air chamber SC can be secured even if the maximum diameter D1 in the additional air chamber member 13 is decreased.

As described above, the embodiment has been explained. However, the present invention is not limited to the above embodiment and can be embodied in various forms. It is noted that in a vehicle wheel according to another embodiment described hereafter, a component identical to that of the above embodiment is labeled the same symbol, and the detailed explanation thereon will be omitted.

In the embodiment described above, the second vertical wall surface 16 is disposed on the side portion 11e of the well portion 11c. However, in the present invention, the second vertical wall surface 16 may be disposed on another rising portion of the well portion 11c. FIG. 7 is a cross sectional view of a rim used for a vehicle wheel according to another embodiment.

As shown in FIG. 7, the well portion 11c of the rim 11 used for this vehicle wheel 10 includes a small diameter portion 23a and a large diameter portion 23b continuing from the small diameter portion 23a via a step portion 11f. It is noted that the step portion 11f corresponds to a "rising portion" together with the side portion 11e (see FIG. 3A) in the embodiment described above. In the rim 11, a bead seat portion 11a is disposed outside the large diameter portion 23b via the side portion 11e of the well portion 11c. That is, in the another embodiment, the edge portion 13e is fitted in the step portion 11f which is further inner side in the radial direction of the rim 11 from the side portion 11e in which one of the edge portions 13e of the additional air chamber member 13 (see FIG. 3A) is fitted in the embodiment described above.

Therefore, in the vehicle wheel 10 according to the another embodiment, the outer circumferential surface 11d of the well portion 11c for fixing the additional air chamber member 13 thereon is disposed further inner side in the radial direction compared with the vehicle wheel 10 according to the embodiment described above.

As a result, in the vehicle wheel 10 according to the another embodiment, since a circumferential length of the outer circumferential surface 11d of the well portion 11c becomes short, the vehicle wheel 10 according to the another embodiment can be further improved in weight saving. In addition, in the vehicle wheel 10 according to the another embodiment, since the additional air chamber member 13 is further shifted to the inner side in the radial direction so as to leave from the bead seat portion 11a compared with the vehicle wheel 10 according to the embodiment described above, a mounting performance of the tire 20 is further improved.

Figure 8A:
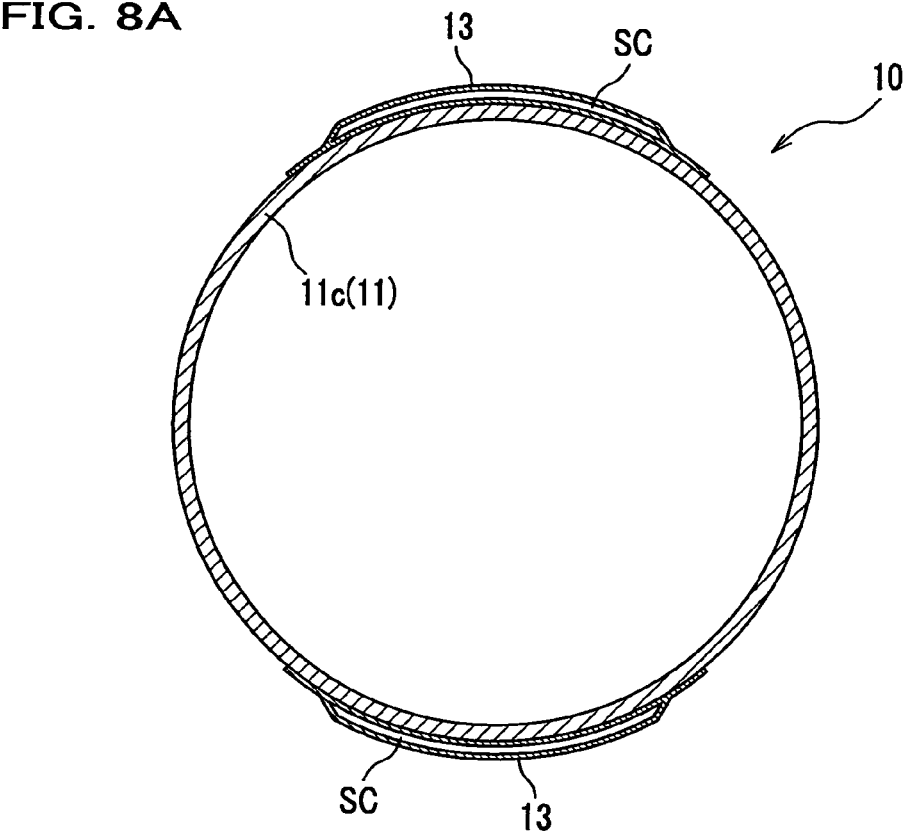
FIG. 8A and FIG. 8B are side cross sectional views of a vehicle wheel according to the another embodiment showing modified examples of arrangements of the additional air chamber member.
Figure 8B:
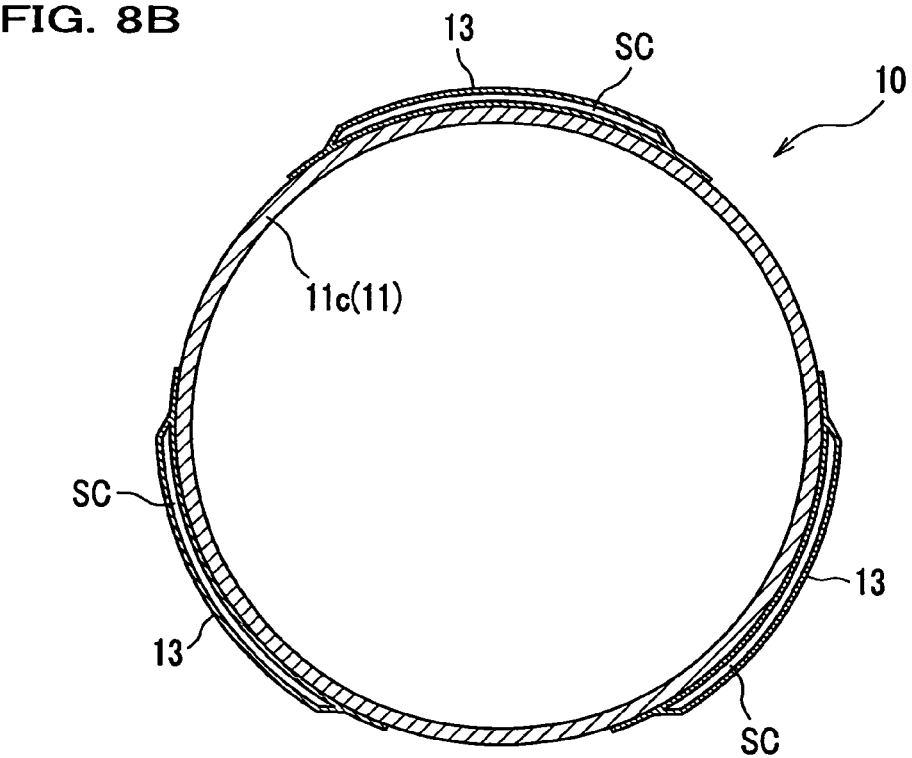

In the embodiment described above, four additional air chamber members 13 are arranged along the circumferential surface of the well portion 11c at regular intervals. However, in the present invention, a number of the additional air chamber member 13 may be not less than five, or not more than three. FIG. 8A and FIG. 8B are side cross sectional views of a vehicle wheel according to another embodiment showing modified examples of arrangements of the additional air chamber member.

In the vehicle wheel 10 shown in FIG. 8A, two additional air chamber members 13 are disposed along the circumferential surface of the well portion 11c at regular intervals.

In the vehicle wheel 10 shown in FIG. 8B, three additional air chamber members 13 are disposed along the circumferential surface of the well portion 11c at regular intervals.

As described above, in the vehicle wheel 10, a number of the additional air chamber member 13 is not limited specifically. However, considering a sound deadening efficiency, it is preferable that the additional air chamber members 13 not less than four (not less than two pairs) are arranged facing each other across the center of the rim. In addition, considering the weight saving and mass productivity of the vehicle wheel 10, it is preferable to arrange two to four additional air chamber members 13 along the circumferential surface of the well portion 11c at regular intervals.

Figure 9A:
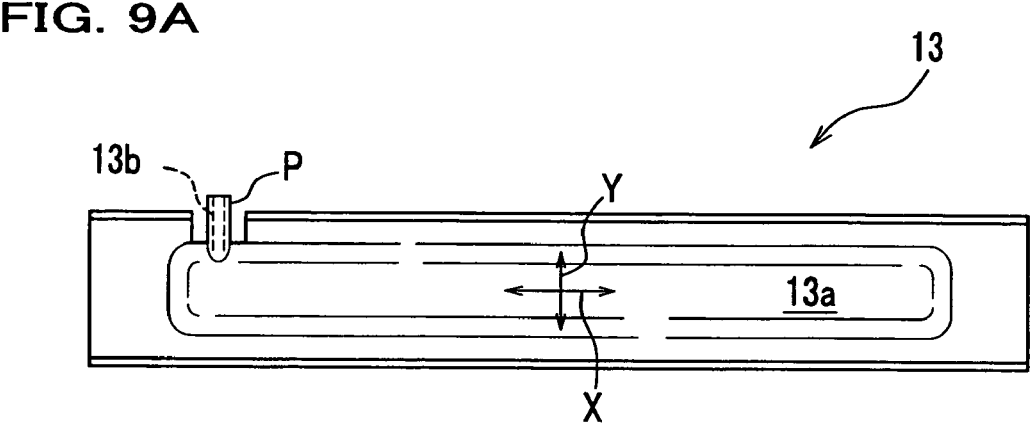
FIG. 9A and FIG. 9B are plane views of additional air chamber members showing a position for forming a communication hole.
Figure 9B:
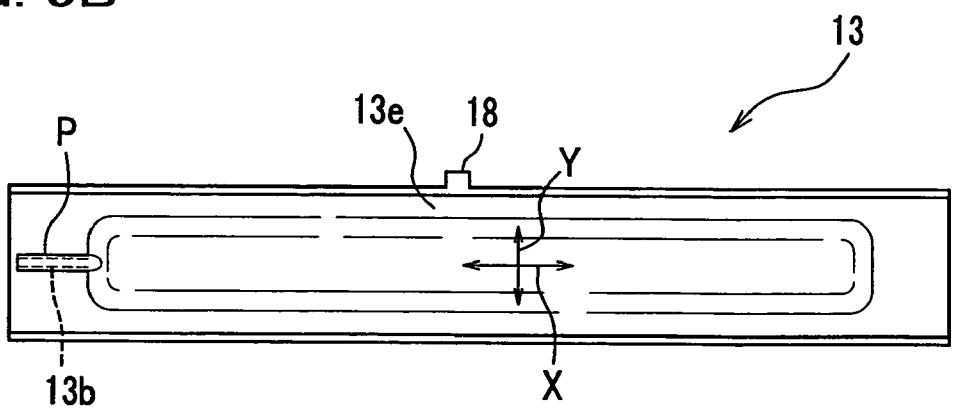

In addition, in the embodiment described above, the communication hole 13b is formed in the middle of the additional air chamber member 13 in the longitudinal direction. However, in the present invention, a position of the communication hole 13b is not limited specifically as long as the position is not inconvenient for mounting the tire 20 on the rim. FIG. 9A and FIG. 9B are plane views of additional air chamber members showing a position for forming a communication hole.

The additional air chamber member 13 shown in FIG. 9A is provided with the tube member P having the communication hole 13b inside the tube member P. The tube member P also has a function as a rotation stopper as described before and is fitted in the recess 14a (see FIG. 3B) formed in the vertical wall 14 (see FIG. 3B). In addition, the tube member P protrudes from the main body 13a toward the Y-direction crossing with the X-direction, which is the rotation direction of the wheel, at one end of the additional air chamber member 13 in the longitudinal direction.

In the additional air chamber member 13 shown in FIG. 9B, the tube member P having the communication hole 13b therein protrudes from the main body 13a toward the X-direction, which is the rotation direction of the wheel, at one end of the additional air chamber member 13 in the longitudinal direction. In addition, the additional air chamber member 13 has the protruding portion 18 as the rotation stopper described above. The protruding portion 18 protrudes from the edge portion 13e toward the Y-direction crossing with the X-direction, which is the rotation direction of the wheel, at the middle of the additional air chamber member 13 in the longitudinal direction, and is fitted in the recess 14a (see FIG. 3B) formed in the vertical wall 14 (see FIG. 3B).

What is claimed is:

1. A vehicle wheel in which an additional air chamber member in a tire air chamber is fixed on an outer circumferential surface of a well portion of a rim of the vehicle wheel, comprising:

a first vertical wall surface rising outward in a radial direction from the outer circumferential surface of the well portion and extending in a circumferential direction of the outer circumferential surface; and a second vertical wall surface formed in the well portion facing the first vertical wall surface, wherein the additional air chamber member comprises a main body having an additional air chamber formed therein; and also a communication hole formed therein; said communication hole adapted to provide communication between the additional air chamber and the tire air chamber; and a pair of end portions extending from peripheral portions of the main body in a width direction of said vehicle wheel;

wherein the additional air chamber member is fitted between the first vertical wall surface and the second vertical wall surface, and said end portions of the additional air chamber member are secured to respective said first vertical wall surface and the second vertical wall surface such that said additional air chamber member is arranged in said well portion and between said first and second wall surfaces; wherein the first vertical wall surface is disposed on a vertical wall substantially vertically disposed on the outer circumferential surface extending in the circumferential direction, and the second vertical wall surface is disposed on a rising portion of the well portion, wherein a groove extending in the circumferential direction is formed on each of the first vertical wall surface and the second vertical wall surface, and each of the end portions of the additional air chamber member is fitted in the groove.

2. The vehicle wheel according to claim 1, wherein the additional air chamber member comprises a curved portion that is in a convex shape against the outer circumferential surface between the both end portions, and when a centrifugal force generated by a rotation of the vehicle wheel works on the additional air chamber member, a pressing force of the both end portions against the first vertical wall surface and the second vertical wall surface is increased by the centrifugal force which works to turn over a curvature of the curved portion in a direction in which the curved portion goes apart from the outer circumferential surface.

3. The vehicle wheel according to claim 1, wherein the additional air chamber member comprises a curved portion that is in a convex shape against the outer circumferential surface between the both end portions, and when a centrifugal force generated by a rotation of the vehicle wheel works on the additional air chamber member, a pressing force of the both end portions against the first vertical wall surface and the second vertical wall surface is increased by the centrifugal force which works to turn over a curvature of the curved portion in a direction in which the curved portion goes apart from the outer circumferential surface.

4. The vehicle wheel according to claim 1, wherein a maximum diameter in the additional air chamber member is set smaller than a maximum diameter in a bead seat portion, and a cross sectional shape of the additional air chamber member is formed flat.

5. The vehicle wheel according to claim 1, wherein a maximum diameter in the additional air chamber member is set smaller than a maximum diameter in a bead seat portion, and a cross sectional shape of the additional air chamber member is formed flat.

6. The vehicle wheel according to claim 1, wherein the well portion comprises a small diameter portion and a large diameter portion continuing from the small diameter portion via a step portion, wherein the first vertical wall surface is disposed on the vertical wall extending in a circumferential direction of the small diameter portion, and the second vertical wall surface is disposed on the step portion.

7. The vehicle wheel according to claim 1, wherein the additional air chamber member comprises a protruding portion protruding in a direction crossing with a rotation direction of the vehicle wheel, and wherein a recess, into which the protruding portion fits, is formed on the vertical wall substantially vertically disposed on the outer circumferential surface.

8. The vehicle wheel according to claim 7, wherein the protruding portion is formed by a tube member, and the communication hole is formed inside the tube member.

9. The vehicle wheel according to claim 1,
wherein the each of said end portions includes a plate-like edge portion, which extends to the first vertical wall surface and to the second vertical wall surface to be fitted in each of the grooves formed on the first vertical wall surface and the second vertical wall surface, respectively, and extends in the circumferential direction along the outer circumferential surface.

* * * * *